US012608552B2

(12) United States Patent
Hong et al.

(10) Patent No.: US 12,608,552 B2
(45) Date of Patent: Apr. 21, 2026

(54) PROMPT CHAINING SYSTEM FOR GENERATIVE ARTIFICIAL INTELLIGENCE SYSTEMS

(71) Applicant: TOYOTA RESEARCH INSTITUTE, INC., Los Altos, CA (US)

(72) Inventors: Matthew Kyung-Soo Hong, Mountain View, CA (US); Yin-Ying Chen, San Jose, CA (US); Yanxia Zhang, Foster City, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 260 days.

(21) Appl. No.: 18/493,732

(22) Filed: Oct. 24, 2023

(65) Prior Publication Data

US 2024/0354513 A1 Oct. 24, 2024

Related U.S. Application Data

(60) Provisional application No. 63/460,977, filed on Apr. 21, 2023.

(51) Int. Cl.
*G06F 17/00* (2019.01)
*G06F 40/279* (2020.01)
*G06F 40/30* (2020.01)
*G06N 5/022* (2023.01)

(52) U.S. Cl.
CPC ............ *G06F 40/30* (2020.01); *G06F 40/279* (2020.01); *G06N 5/022* (2013.01)

(58) Field of Classification Search
None
See application file for complete search history.

(56) References Cited

U.S. PATENT DOCUMENTS

| | | | | |
|---|---|---|---|---|
| 9,528,847 | B2 | 12/2016 | Albrecht | |
| 11,126,798 | B1 * | 9/2021 | Lewis Meza | ......... G06F 40/211 |
| 11,182,556 | B1 * | 11/2021 | Lewis Meza | ......... G06F 40/205 |
| 11,562,028 | B2 * | 1/2023 | Appel | ................... G06F 40/216 |
| 11,797,610 | B1 * | 10/2023 | Ferrucci | ................. G06F 40/30 |
| 11,816,435 | B1 * | 11/2023 | Lewis Meza | ........... G06F 40/30 |
| 2021/0342380 | A1 * | 11/2021 | Luus | ...................... G06N 3/042 |
| 2022/0405487 | A1 * | 12/2022 | Bhandari | ............... G06N 20/00 |

OTHER PUBLICATIONS

Leonie Monigatti, "A Beginner's Guide to Prompt Design for Text-to-Image Generative Models", Website article, https://towardsdatascience.com/a-beginners-guide-to-prompt-design-for-text-to-image-generative models-8242e1361580, Sep. 20, 2022.

(Continued)

*Primary Examiner* — Satwant K Singh
(74) *Attorney, Agent, or Firm* — Seyfarth Shaw LLP

(57) ABSTRACT

A method for processing text prompts includes identifying a set of elements in a text prompt that form a basis for a generative output. The method also includes identifying an element of the set of elements that satisfy a refinement condition. The method further includes updating the element based on the element satisfying the refinement condition. The method still further includes generating the generative output in accordance with updating the element.

12 Claims, 6 Drawing Sheets

(56)                    References Cited

OTHER PUBLICATIONS

Jonas Oppenlaender, "A Taxonomy of Prompt Modifiers for Text-To-Image Generation", arXiv:2204.13988 [cs.MM]; Jul. 31, 2022.
Yunlong Wang, "RePrompt: Automatic Prompt Editing to Refine AI-Generative Art Towards Precise Expressions", arXiv:2302.09466 [cs.HC], Apr. 23-28, 2023.
Vivian Liu, "Opal: Multimodal Image Generation for News Illustration", arXiv:2204.09007 [cs.HC], Aug. 16, 2022.

* cited by examiner

300

600

IDENTIFY A SET OF ELEMENTS IN A TEXT PROMPT THAT FORM A BASIS FOR A GENERATIVE OUTPUT — 602

IDENTIFY AN ELEMENT OF THE SET OF ELEMENTS THAT SATISFY A REFINEMENT CONDITION — 604

UPDATE THE ELEMENT BASED ON THE ELEMENT SATISFYING THE REFINEMENT CONDITION — 606

GENERATE THE GENERATIVE OUTPUT IN ACCORDANCE WITH UPDATING THE ELEMENT — 608

PROMPT CHAINING SYSTEM FOR GENERATIVE ARTIFICIAL INTELLIGENCE SYSTEMS

CROSS-REFERENCE TO RELATED APPLICATION

The present application claims the benefit of U.S. Provisional Patent Application No. 63/460,977, filed on Apr. 21, 2023, and titled "INTERACTIVE PROMPT CHAINING SYSTEM TO RESOLVE ANOMALOUS, AMBIGUOUS AND UNDERSPECIFIED ELEMENTS IN TEXT-TO-VISUAL CONTENT GENERATION," the disclosure of which is expressly incorporated by reference in its entirety.

BACKGROUND

Field

Aspects of the present disclosure generally relate to generative models, and more specifically to systems and methods for resolving ambiguity in text prompts for generative models.

Background

Generative models, such as generative artificial intelligence (AI) models, exemplify the capabilities of AI models trained on extensive datasets of pre-existing content (hereinafter referred to as "training data"). Based on this training, generative AI models may discern intricate patterns and establish meaningful connections within the training data and/or input data. When provided with a prompt, a generative AI model may create content in the form of text, images, and/or music in accordance with the training data and/or previous input data.

The rapid advancements in generative AI models have made them more accessible to individuals without specialized expertise. However, there are cases where obtaining a desired output from a generative AI model can be challenging due to an inadequate prompt. To tackle this issue, prompt engineering may be used to craft effective prompts that produce the desired outcomes. In some scenarios, natural language processing (NLP) techniques are utilized to formulate these effective prompts.

SUMMARY

In one aspect of the present disclosure, a method for processing text prompts includes identifying a set of elements in a text prompt that form a basis for a generative output. The method also includes identifying an element of the set of elements that satisfy a refinement condition. The method further includes updating the element based on the element satisfying the refinement condition. The method further includes generating the generative output in accordance with updating the element.

Another aspect of the present disclosure is directed to an apparatus including means for identifying a set of elements in a text prompt that form a basis for a generative output. The apparatus further includes means for identifying an element of the set of elements that satisfy a refinement condition. The apparatus also includes means for updating the element based on the element satisfying the refinement condition. The apparatus further includes means for generating the generative output in accordance with updating the element.

In another aspect of the present disclosure, a non-transitory computer-readable medium with non-transitory program code recorded thereon is disclosed. The program code is executed by a processor and includes program code to identify a set of elements in a text prompt that form a basis for a generative output. The program code also includes program code to identify an element of the set of elements that satisfy a refinement condition. The program code further includes program code to update the element based on the element satisfying the refinement condition. The program code still further includes program code to generate the generative output in accordance with updating the element.

Another aspect of the present disclosure is directed to an apparatus having a processor, and a memory coupled with the processor and storing instructions operable, when executed by the processor, to cause the apparatus to identify a set of elements in a text prompt that form a basis for a generative output. Execution of the instructions also cause the apparatus to identify an element of the set of elements that satisfy a refinement condition. Execution of the instructions further cause the apparatus to update the element based on the element satisfying the refinement condition. Execution of the instructions still further cause the apparatus to generate the generative output in accordance with updating the element.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
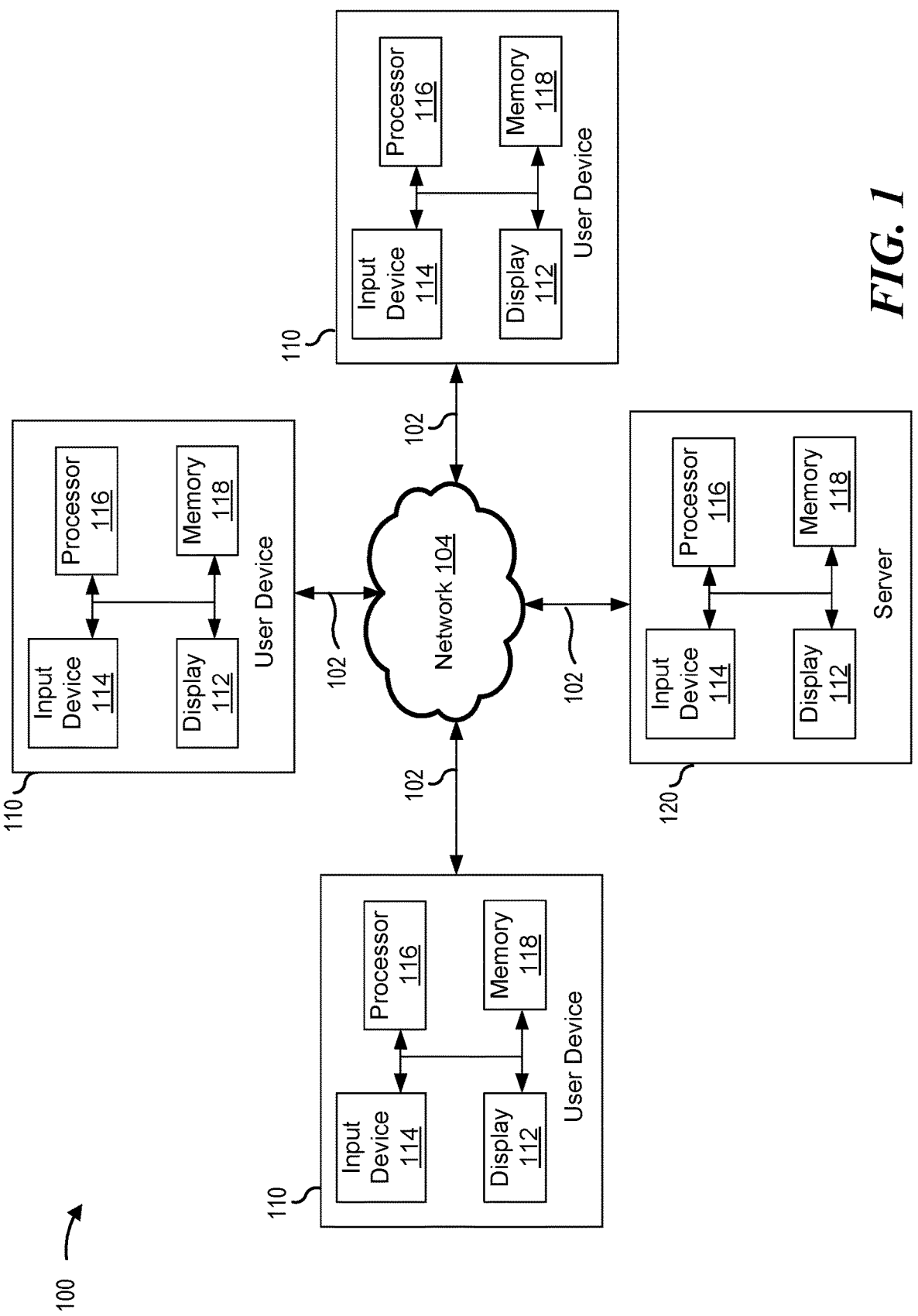
FIG. 1 is a block diagram illustrating an example of a system generating content via a generative artificial intelligence (AI) model, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As discussed, generative artificial intelligence (AI) models are trained to discern patterns and establish meaningful connections within datasets of pre-existing content (hereinafter referred to as "training data"). Based on this training, generative AI models may discern intricate patterns and establish meaningful connections within the input data. When provided with a prompt, a generative AI model may create content in the form of text, images, and/or music in accordance with the training and/or previous input data.

Generative AI models can produce outputs that are nearly indistinguishable from those generated by humans, making them incredibly powerful tools for a wide range of applications, from generating creative content to automating customer service interactions. Additionally, the rapid advancements in generative AI models have made them more accessible to individuals without specialized expertise. However, there are cases where obtaining a desired output from a generative AI model can be challenging due to an inadequate prompt. To tackle this issue, prompt engineering may be used to craft effective prompts that produce the desired outcomes. In some scenarios, natural language processing (NLP) techniques are utilized to formulate these effective prompts. Prompt engineering helps to unlock the full potential of generative AI by making it easier for more non-experts to benefit from these powerful tools.

In certain situations, prompt engineering may be useful for creating prompts that are designed for generative AI models that produce text-based outputs. However, as previously discussed, some generative AI models may generate images, music, or other forms of multimedia content. In such instances, traditional prompt engineering might not be suitable due to the cognitively demanding task of translating a text description into a visual output.

Typically, generative AI models that generate images or media content require a clear and precise articulation of the intended meanings. Specifically, the prompt should provide a specific design ontology, such as surrealism or extreme close-up shots, such that the generative AI model can accurately interpret and replicate a user's desired output. In most cases, text prompts may be eccentric, unclear, or inadequately defined. This leads to generated image depictions that may not align with the user's envisioned concept.

Consequently, achieving a desired output from a generative AI model may be a time-consuming iterative process. In such cases, a user may need to continually refine a prompt in order to gradually guide the generative model towards the intended result, adding significant time and effort to the process. These challenges underscore the complexity and potential hurdles involved when seeking to leverage text-based prompts for non-textual generative AI outputs.

Various aspects of the present disclosure are directed to improving a quality of visual content generated from initial prompts by using an interactive system that refines an input prompt by iteratively eliciting a user's intention. This approach is an improvement over existing methods that primarily focus on generating permutations or increasing the quantity of the initial prompt. By refining the input prompt, aspects of the present disclosure bridge a gap between an input prompt and an output of a generative AI model caused by eccentric, unclear, and/or insufficiently defined text components in the input prompt.

FIG. 1 is a block diagram illustrating an example of a system 100 generating content via a generative AI model, in accordance with aspects of the present disclosure. As shown in the example of FIG. 1, the system 100 may include one or more user devices 110 and one or more servers 120. For ease of explanation, only one server 120 is shown in the example of FIG. 1. Each user device 110 may be connected to a network 104 via one or more communication links 102. The communication links 102 may be wired and/or wireless communication links. The server 120 may also be connected to the network 104 via a communication link 102.

The network 104 may be an example of the Internet. Additionally, or alternatively, the network 104 may include any suitable computer network such as an intranet, a wide-area network (WAN), a local-area network (LAN), a wireless network, a digital subscriber line (DSL) network, a frame relay network, an asynchronous transfer mode (ATM) network, and/or a virtual private network (VPN). The communication links 102 may be any type of communication link that may be suitable for communicating data between user devices 110 and the server 120. For example, the communication links 102 may network links, dial-up links, wireless links (e.g., Wi-Fi link, satellite link, or cellular communication link), and/or hard-wired links.

The server 120 may be a computing device, such as a server, processor, computer, cloud computing device, cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to host a generative AI model and communicate via a wireless or wired medium. In some examples, the server 120 may host a generative AI model. In some such examples, one or more server 120 may work in tandem to host the generative AI model. Specifically, the server 120 may implement functions and/or computer code that runs the generative AI model and/or a site, such as a website, for accessing the generative AI model.

Each user device 110 may be an example of a personal computing device, a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. A user device 110 may be used by a user to input a prompt to a generative AI model via an interface associated with the generative AI model. The interface may be accessed via a website or a dedicate application, such as a mobile phone application. Additionally, or alternatively, the user device 110 may store the generative AI model, and the user may input a prompt via an interface associated with the stored generative AI model. In some examples, each user device 110 shown in FIG. 1 may be used by a different user. Each user device 110 and server 120 may be stationary or mobile.

In some examples, each user device 110 may be included inside a housing that houses components of the user device 110, such as one or more processors 116 and a memory 118. The housing may also include, or be connected to, a display 112 and an input device 114, which may be interconnected with other components of the user device 110. For ease of explanation, only one processor 116 is shown for each user device 110. In some examples, the one or more processors 116, the display 112, the input device 114, and the memory 118 may be interconnected via a bus architecture. The memory 118 may include one or more different types of memory, such as random access memory (RAM), static RAM (SRAM), dynamic RAM (DRAM), and/or another type of memory. Each user device 110 may also include a storage device (not shown in the example of FIG. 1), such as a hard disk (e.g., non-transitory computer readable medium). In some examples, the memory 118 and/or the storage device include program code (e.g., instructions) that may be executed by the processor 116 to control one or more functions of the user device 110. The input device 114 may be used to navigate the interface associated with the generative AI model, provide input to a prompt engineering model, and/or perform other tasks. Working in conjunction with one or more components of the user device 110, the processor 116 may receive information associated with the generative AI model, and control the display 112 to output information associated with the generative AI model. The display 112 may output (e.g., display) information received at the processor 116. In some examples, the processor 116 of the user device 110 is configured to perform operations and implement one or more elements associated with one or more processes, such as the process 600 described with respect to FIG. 6.

In some examples, a generative AI host may maintain the server 120. The server 120 may be included inside a housing that houses components of the server 120, such as one or more processors 116 and a memory 118. The housing may also include, or be connected to, a display 112 and an input device 114, which may be interconnected with other components of the user device 110. For ease of explanation, only one processor 116 is shown for the server 120. In some examples, the one or more processors 116, the display 112, the input device 114, and the memory 118 may be interconnected via a bus architecture. The memory 118 may include one or more different types of memory, such as RAM, SRAM, DRAM, and/or another type of memory. The server 120 may also include a storage device (not shown in the example of FIG. 1), such as a hard disk (e.g., non-transitory computer readable medium). In some examples, the memory 118 and/or the storage device include program code (e.g., instructions) that may be executed by the processor 116 to control one or more functions of the server 120. For example, the processor 120 may execute instructions for maintaining the generative AI model, training the generative AI model, and/or executing the generative AI model. In some examples, the processor 116 of the server 120 is configured to perform operations and implement one or more elements associated with one or more processes, such as the process 600 described with respect to FIG. 6. Additionally, or alternatively, the processor 116 of the server 120 may be configured to perform operations associated with the prompt engineering model 260 described with reference to FIGS. 2 and 5.

Figure 2:
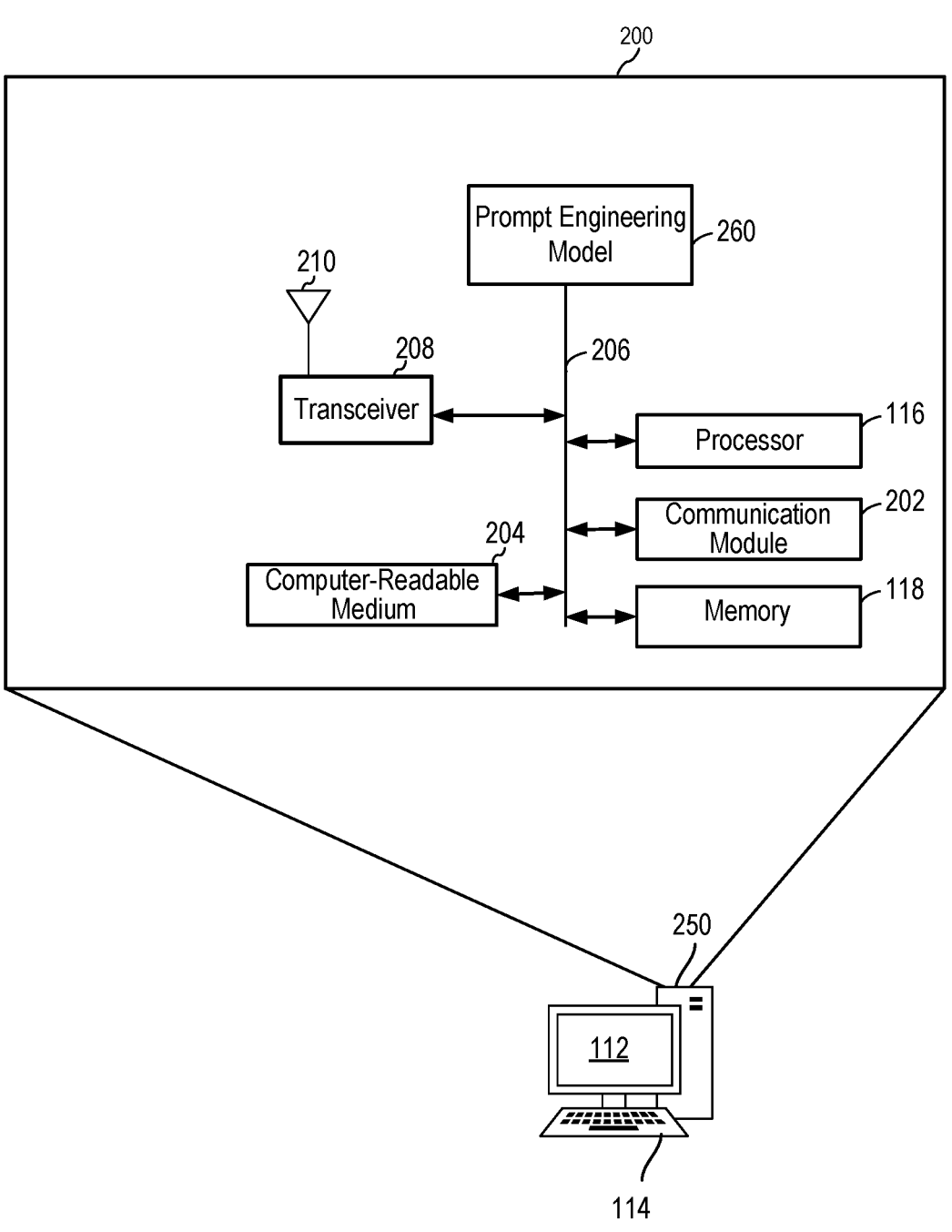
FIG. 2 is a diagram illustrating an example of a hardware implementation for a system, in accordance with aspects of the present disclosure.

FIG. 2 is a diagram illustrating an example of a hardware implementation for a system 200, according to various aspects of the present disclosure. The system 200 may be a component of a device 250. The device 250 may be an example of a user device 110 or a server 120 described with reference to FIG. 1. As shown in the example of FIG. 2, the device 250 may include a display 112 and an input device 114 (e.g., a keyboard). In some examples, the system 200 is configured to perform operations and implement one or more elements associated with one or more processes, such as the process 600 described with reference to FIG. 6.

The system 200 may be implemented with a bus architecture, represented generally by a bus 206. The bus 206 may include any number of interconnecting buses and bridges depending on the specific application of the system 200 and the overall design constraints. The bus 206 links together various circuits including one or more processors and/or hardware modules, represented by a processor 116, and a communication module 202. The bus 206 may also link various other circuits such as timing sources, peripherals, voltage regulators, and power management circuits, which are well known in the art, and therefore, will not be described any further.

The system 200 includes a transceiver 208 coupled to the processor 116, the communication module 202, and the computer-readable medium 204. The transceiver 208 is coupled to an antenna 210. The transceiver 208 communicates with various other devices over a transmission medium, such as a communication link 102 described with reference to FIG. 1. For example, the transceiver 208 may receive commands via transmissions from a user or a remote device.

As shown in the example of FIG. 2, the system 200 may include a prompt engineering model 260 that may be trained to perform one or more tasks associated with refining a prompt provided for a generative AI model. For example, the prompt engineering model 260 may be trained to perform the tasks described with reference to the one or more modules and engines described with reference to FIG. 5. The prompt engineering model 260 may include artificial or computational intelligence elements, such as, neural network, fuzzy logic, or other machine learning algorithms. In one or more arrangements, one or more of the other modules 116, 118, 202, 204, 208, can also include artificial or computational intelligence elements, such as, neural network, fuzzy logic, or other machine learning algorithms. Further, in one or more arrangements, one or more of the modules 116, 118, 202, 204, 208 can be distributed among multiple modules 116, 118, 202, 204, 208, 260 described herein. In one or more arrangements, two or more of the modules 116, 118, 202, 204, 208, 260 of the system 200 can be combined into a single module.

The system 200 includes the processor 116 coupled to the computer-readable medium 204. The processor 116 performs processing, including the execution of software stored on the computer-readable medium 204 providing functionality according to the disclosure. The software, when executed by the processor 116, causes the system 200 to perform the various functions described for a particular device, such as any of the modules 116, 118, 202, 204, 208, 260. For example, when executed by the processor 116, the software causes the system 200 and/or the prompt engineering model 260 to implement one or more elements associated with one or more processes, such as the process 600 described with respect to FIG. 6. The computer-readable medium 204 may also be used for storing data that is manipulated by the processor 116 when executing the software. For example, working in conjunction with one or more of the other modules the modules 116, 118, 202, 204, and 208, the prompt engineering model 260) may perform one or more operations, such as one or more operations of the process 600 described with reference to FIG. 6.

As indicated above, FIGS. 1 and 2 are provided as examples. Other examples may differ from what is described with regard to FIGS. 1 and 2.

As discussed, a quality of an output from a generative AI model may be correlated to a quality of an input prompt. For example, for generative AI models that produce visual content, text prompts can often be eccentric, unclear, or inadequately defined. This leads to generated image depictions that may not align with a user's envisioned concept. In contrast, an input prompt with a clear and precise articulation of the intended meanings may cause the generative AI model to generate content that aligns with the user's envisioned concept. For example, an input prompt that provides a specific design ontology, such as surrealism or extreme close-up shots, may cause the generative AI model to accurately interpret and replicate the user's desired output. In the present application, a generative AI model may also be referred to as a generative model.

Figure 3:
FIG. 3 is an illustration of an example of an output of a generative AI model, in accordance with aspects of the present disclosure.

FIG. 3 is an illustration of an example of an output 300 of a generative AI model, in accordance with aspects of the present disclosure. In the example of FIG. 3, a user may input "a black and white line drawing of a cat wearing sunglasses" to a generative model that generates an image 300 in response to the prompt. The generative model selected the type of cat, the pose of the cat, the type of sunglasses, and other design choices. That is, unless a prompt specifically provides design cues, such choices may be made by the generative model. In the example of FIG. 3, the image 300 may be different from a desired output intended by the user. For example, the user may have desired a specific type of cat and/or a specific artistic style (e.g., impressionist, anime, etc.). In the example of FIG. 3, to achieve the desired output, the user may iteratively refine the input prompt until the generative model outputs the intended result. The input prompt would be provided to the generative model at each iteration. This iterative refinement process adds significant time and effort to the process of obtaining an intended output from the generative model.

In the example of FIG. 3, the prompt describes a scene that does not conform to expected behavior because cats do not wear glasses. As another example, a prompt "a fish swimming in sand," describes a scene that does not conform to expected behavior because fish swim in water. Because such prompts do not conform to expected behavior, initially, the generative model may fail to generate a desired output in response to the prompt. One or more revisions may be necessary to obtain the desired output from the generative model.

Additionally, or alternatively, a prompt may be ambiguous. For example, a prompt: "a school of fish," may be ambiguous because it is unclear whether the user would like an image of a group of fish or fish in an educational institution. In such an example, the generative AI model may most likely generate an image of a group of fish because a group of fish is referred to as a "school of fish."

Additionally, or alternatively, a prompt may have underspecified elements. For example, a prompt: "a robotic fish swimming with its friends," may have one or more underspecified elements. In such an example, the underspecified elements may include a type of fish, a swimming direction, a swimming environment (e.g., ocean, fish tank, etc.), an identity of the friends, and/or a number of friends. In this example, the generative AI model may take creative liberty when generating the type of fish, the swimming direction, the swimming environment, the identity of the friends, and/or the number of friends. Because the example prompt includes one or more underspecified elements, initially, the generative model may fail to generate a desired output in response to the prompt. One or more revisions may be necessary to obtain the desired output from the generative model. That is, one or more input-output loops may be needed until the desired output is obtained from the generative model.

In some aspects, prompt engineering may be used to improve an input prompt prior to submitting the input prompt to the generative model. For example, prompt engineering may be used to improve ambiguous prompts, prompts that describe a scene that does not conform to expected behavior, and/or prompts with one or more underspecified elements. Prompt engineering refers to the iterative process of discovering text inputs to achieve desired outcomes. Various aspects of the present disclosure are directed to a prompt engineering system for improving a quality of visual content generated from an initial prompt. In some examples, the prompt engineering system is an interactive system that iteratively elicits feedback from the user prior to submitting the input prompt to the generative model.

By interactively prompting users to provide additional details and/or remove ambiguities, the prompt engineering system may aid a user in iteratively improving the scene, thereby reducing a number of input-output loops required to obtain a desired output from the generative model. Furthermore, based on aspects of the present disclosure, an output of the generative model may have subjectively rich scenes and imagery that aligns with a user's intended visual concept. Furthermore, in some examples, users may retain control over specific design elements. For example, in the robotic fish example described above, aspects of the present disclosure may allow the user to specify a robotic look and feel to fins or scales, instead of the generative model producing variations of the entire fish body and environment.

In some examples, an initial prompt may be partitioned into numerous scenes and/or objects. This process encourages the user to use concise keywords and/or phrases that provide additional details and fill in any information gaps. The keywords and/or phrases may improve a model's understanding of a user's intended meaning, leading to an that matches, or more closely matches, the user's desired output.

Figure 4A:
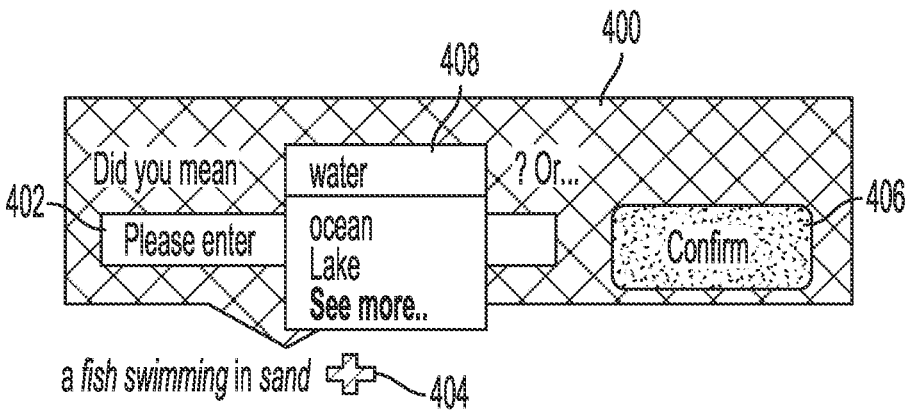
FIGS. 4A, 4B, and 4C are diagrams illustrating examples of prompt user interface (UI), in accordance with various aspects of the present disclosure.

FIG. 4A is a diagram illustrating an example of prompt user interface (UI) 400, in accordance with various aspects of the present disclosure. The prompt user interface may be a component of the prompt engineering model 260 described with reference to FIG. 2. In the example of FIG. 4A, a user may provide an initial prompt: "a fish swimming in sand." The initial prompt may be provided via user input at a user interface associated with a generative model. The user interface may be associated with a user device, such as a mobile computing device or a personal computer. The generative model may be hosted at a remote device that may be accessed by the user via an interface of an application, such as a web browser or proprietary generative AI application, associated with the user device. In such examples, the user device may communicate with the remote device via a network interface. In the example of FIG. 4A, the words "fish," "swimming," and "sand" may be segmented from the initial prompt because each of the words represents a scene or an object. The segmented words may be referred to as keywords. Other criteria may be used for segmenting words, for example, words associated with people, locations, and/or time may be segmented, as these words may require further specification or disambiguation.

Upon parsing the prompt, the keywords may be distinguished from the other words in the prompt. For instance, in the example of FIG. 4A, the keywords: "first," "swimming." and "sand" may be emphasized (e.g., highlighted or underlined), while the other words, such as "a" and "in," remain unaltered. The user can choose one of the highlighted words to receive a suggestion. These recommendations could be alternative words or phrases that add more context or clarify the original word.

As an example, referring to FIG. 4A, the user may select the word "sand." In this example, the prompt interface may propose alternatives to "sand," such as "water." "ocean," or "lake." These suggestions are offered based on the context of other keywords ("fish" and "swimming") in the prompt. In other words, considering fish typically swim in a liquid rather than sand, the prompt interface may offer words associated with environments where a fish would be expected to swim.

As shown in the example of FIG. 4A, aspects of the present discloser are not limited to providing three alternatives to the word "sand." Additional alternatives may be provided by selecting a "see more" menu item. Alternatively, the user may provide an alternate word via a text input box 402. Furthermore, an icon 404 may be provided for the user to expand the initial prompt. Finally, in some examples, the user may confirm their selection via a confirmation button 406. The selected word (e.g., "sand") may be replaced with a suggested word in accordance with receiving the confirmation via the confirmation button 406. Alternatively, the selected word may be replaced based on the user selecting a word from the suggestion window 408. That is, the confirmation via the confirmation button 406 may be optional.

As discussed, the user may select one of the keywords. In some examples, the user may select a keyword, such as "sand," via a user input device, such as an input device 114 described with reference to FIG. 1. The user may either actively select the keywords or merely hover over the keywords with a cursor.

Figure 4B:
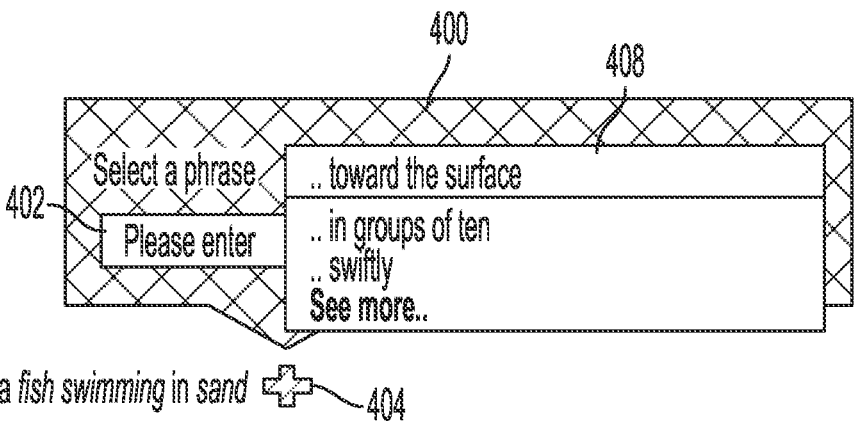

As discussed, in some examples, the user may expand the initial prompt. FIG. 4B is a diagram illustrating another example of the prompt UI 400, in accordance with various aspects of the present disclosure. In the example of FIG. 4B, a user provided an initial prompt: "a fish swimming in sand." As described with reference to FIG. 4A, the initial prompt may be parsed to identify the keywords representing a scene or an object. In some examples, the keywords may be words that are not articles, such as "a" or "the."

As shown in the example of FIG. 4B, the user may select the icon 404 to expand the initial prompt. In accordance with selecting the icon 404, the prompt user interface may suggest one or more words and/or phrases to expand the initial prompt. The suggestions may be based on the context of the initial prompt. For example, as shown in the example of FIG. 4B, the suggested expansions are "toward the surface," "in groups of ten," and "swiftly." These suggestions are associated with the swimming behavior of fish.

Figure 4C:
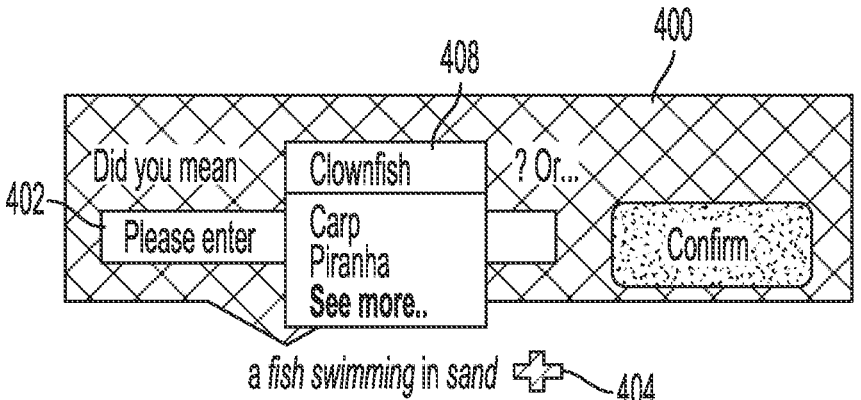

FIG. 4C is a diagram illustrating another example of the prompt UI 400, in accordance with various aspects of the present disclosure. In the example of FIG. 4C, a user provided an initial prompt: "a fish swimming in sand." As described with reference to FIG. 4A, the initial prompt may be parsed to identify keywords. In the example of FIG. 4C, the user may select the word "fish." In this example, the prompt interface may generate a suggestion window 408 to propose alternatives to "fish," such as "clownfish," "carp," or "piranha." These suggestions are offered to provide more specificity to an ambiguous or general term, such as fish. The word "fish" may be replaced by one or more of the suggestions provided via the suggestion window 408 or the text input box 402.

The keywords enable the prompt engineering model to offer supplementary words and/or phrases. In such examples, the supplementary words and/or phrases may provide additional information to address any missing details or offer corrective feedback to tweak the output until it aligns with their satisfaction. Users have the autonomy to exert control over the extent of detail they provide, allowing them to intentionally under or over-specify certain elements. Additionally, or alternatively, the prompt engineering model may expand an initial prompt, or an edited prompt, based on the keywords.

In some examples, the prompt engineering model may provide suggestions and/or expand a prompt to influence the specific attributes of an object or a scene, such as color, size, orientation, or even more abstract qualities, such as mood or style. This provides an added layer of personalization and precision to the output.

The prompt engineering model may be trained to understand and adapt to these user instructions, thereby generating numerous unique, specific scenes based on the users' preferences and intentions. This adaptability results in a more iterative and interactive user experience. The prompt engineering model constitutes a cyclical system, which may be an example of a chaining system. The chaining system begins with the initial user prompt, proceeds with the system generating additional prompts and absorbing user feedback, and culminates in the synthesis of user ideas into the final generated scenes. This cycle can continue until the user is fully satisfied with the outcome, leading to a highly personalized and user-centered approach to content generation.

Figure 5:
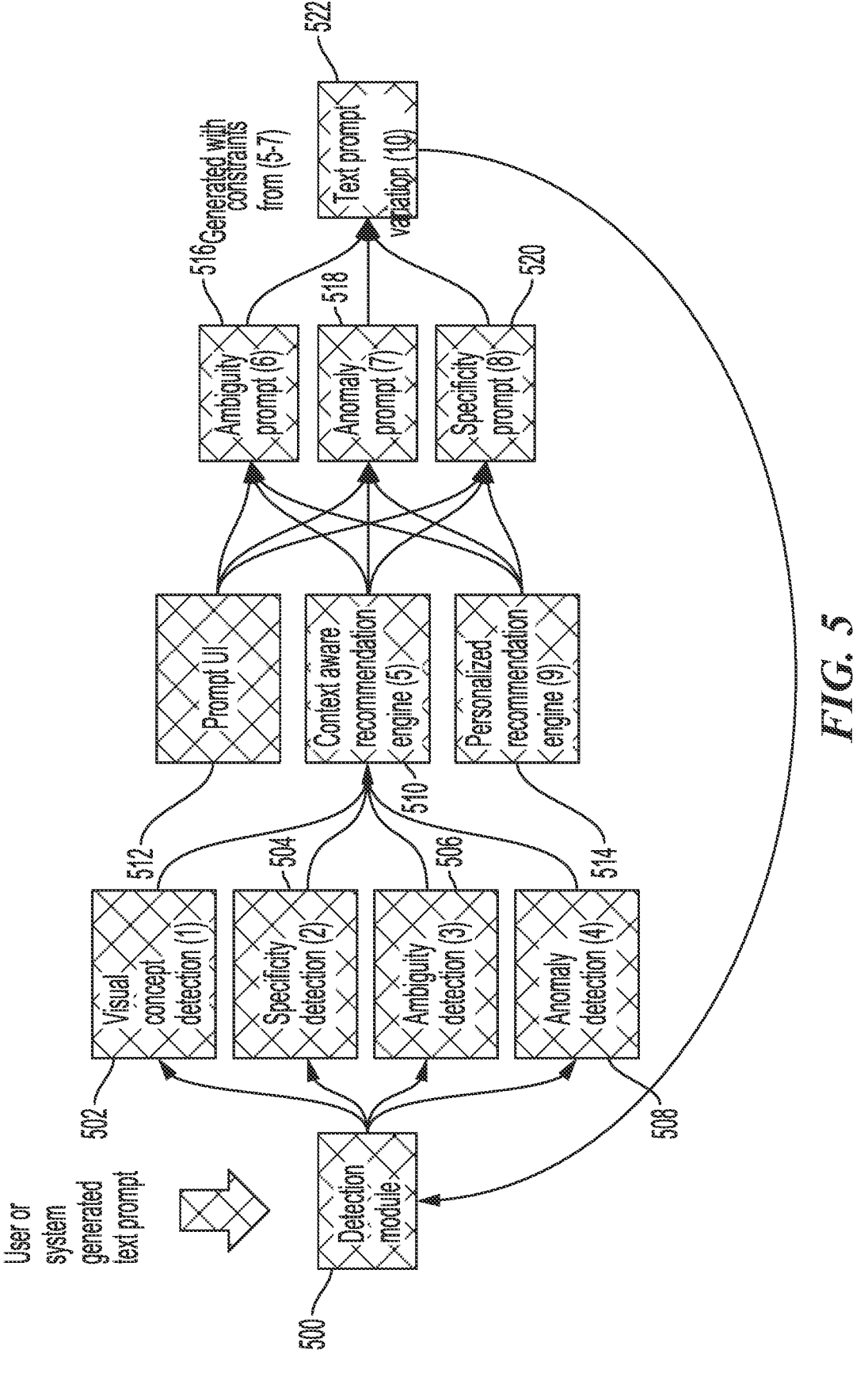
FIG. 5 is a block diagram illustrating modules and engines associated with a prompt engineering model, in accordance with aspects of the present disclosure.

In some examples, the prompt engineering model may be a multi-faceted system including several interconnected modules. These modules may work synergistically to transform text inputs into detail-oriented visual outputs that match, or are similar to, the user's intended output. FIG. 5 is a block diagram illustrating modules and engines associated with a prompt engineering model 260, in accordance with aspects of the present disclosure. The modules and engines described for the prompt engineering model 260 may work in conjunction with a large language model. Additionally, or alternatively, one or more of the modules and engines described for prompt engineering model 260 may be stand-alone models trained to perform the specified tasks.

As shown in the example of FIG. 5, the prompt engineering model 260 may receive a user generated prompt or a system generated prompt at a detection module 500. A system generated prompt may be generated by a prompt generation model or another type of prompt generation system. The detection module 500 detects the received prompt and provides the prompt to one or more of a visual concept detection module 502, a specificity detection module 504, an ambiguity detection module 506, and an anomaly detection module 508. Other modules may be considered. Aspects of the present disclosure are not limited to the modules shown in the example of FIG. 5.

In some examples, the visual concept detection module 502 may identify elements in the prompt that have the potential for visual representation. For example, the visual concept detection module 502 may identify nouns and/or adjectives that are associated with visual elements, such as structures, natural phenomena, or groups of people. The visual concept detection module 502 may disregard articles, such as "a" or "the." Depending on the context, the visual concept detection module 502 may also disregard prepositions, such as "in."

The specificity detection module 504 may identify elements that are understated or lack detail. These elements may include, for example, named entities, movement or actions, number of entities, their size, time of day, and/or spatial orientation. For instance, a generic term, such as "bird," may be flagged for its ambiguity, as the specifics of its species, size, or color are not provided.

The ambiguity detection module 506 may use semantics to identify ambiguous words or phrases. Ambiguous words or phrases may have more than one meaning. For example, the word "bank" may refer to a financial institution or a river bank. As another example, the word "crane" may refer to a type of bird or construction equipment. In these examples, the ambiguity detection module 506 may flag "bank" and "crane" as being ambiguous.

The anomaly detection module 508 may identify patterns that deviate from the expected norms in a given scene description. For example, if the prompt describes a scene that includes a "penguin in a desert," the anomaly detection module 508 may flag the description as anomalous due to the mismatch between the penguin's natural habitat (e.g., cold environment) and the described environment (e.g., desert).

As shown in the example of FIG. 5, a context-aware recommendation engine 510 may receive input from one or more of the visual concept detection module 502, the specificity detection module 504, the ambiguity detection module 506, and the anomaly detection module 508. The respective inputs may identify visual concepts, underspecified elements, ambiguous elements, and/or anomalies associated with the prompt. The context-aware recommendation engine 510 may be a large language model. In some examples, in accordance with receiving the one or more inputs, the context-aware recommendation engine 510 generates a prioritized list of plausible keywords or phrases for refining the current prompt. For example, the current prompt may be refined to be more descriptive or to add additional context.

The prompt engineering model 260 may also include a prompt UI module 512 for generating a prompt UI, such as the prompt UI 400 described with reference to FIGS. 4A, 4B, and 4C. As shown in the example of FIG. 5, the prompt engineering model 260 may also include a personalized recommendation engine 514 that provides recommendations based on historical data from the user, such as frequently used subject terms or commonly used ambiguous terms in previous prompts. For example, if a user regularly uses an ambiguous term, the system may provide recommendations selected by the user to clarify the same ambiguous term. Personalization may also be based on other user details, such as, but not limited to, details about the user's professional background, creative projects they usually undertake, or their hobbies. This data may be obtained during the user's initial introduction to the system through a set of queries. Additionally, or alternatively, the data may be obtained by reviewing other user data, such as cookies, browsing habits, or publicly available information. This process may be similar to the approach adopted by film or music recommendation platforms. This ability to learn from the user's history may tailor the recommendations of the prompt engineering model 260 to the user's preferences.

The context-aware recommendation engine 510, prompt UI module 512, and personalized recommendation engine 514 may work in conjunction with one or more user interface modules 516, 518, and 520. In some examples, the prompt UE module 512 may interact with an ambiguity prompt module 516 to prompt the user to specify their intended meaning. In such examples, the ambiguity prompt module 516 may select one or more recommendations from the context-aware recommendation engine 510 and/or personalized recommendation engine 514 to generate one or more recommendations, via the prompt UI module 512, to clarify an ambiguous keyword. For example, as described with reference to FIG. 4C, the prompt UI 400 may provide recommendations for clarifying the keyword "fish." In the example of FIG. 4C, the recommendations "clownfish," "carp," and "piranha" may be provided by the ambiguity prompt module 516 based on one or more recommendations from the context-aware recommendation engine 510 and/or personalized recommendation engine 514.

Additionally, or alternatively, in some examples, the prompt UE module 512 may interact with an anomaly prompt module 518 to prompt the user to clarify any potentially confusing or unusual language usage. In such examples, the anomaly prompt module 516 may select one or more recommendations from the context-aware recommendation engine 510 and/or personalized recommendation engine 514 to generate one or more recommendations, via the prompt UI module 512, to clarify an anomalous keyword. For example, as described with reference to FIG. 4A, the prompt UI 400 may provide recommendations for clarifying the keyword "sand" because "fish" and "sand" are generally unrelated. In the example of FIG. 4A, the recommendations "water," "ocean," and "lake" may be provided by the anomaly prompt module 518 based on one or more recommendations from the context-aware recommendation engine 510 and/or personalized recommendation engine 514.

Additionally, or alternatively, in some examples, the prompt UE module 512 may interact with a specificity prompt module 520 to recommend alternatives for underspecified concepts. The alternatives may be provided in succession until the specificity of the prompt satisfies a specificity condition. For example, the specificity condition may be satisfied when specificity detection module 504 does not identify any underspecified terms. In such examples, the specificity prompt module 520 may select one or more recommendations from the context-aware recommendation engine 510) and/or personalized recommendation engine 514 to generate one or more recommendations, via the prompt UI module 512, to clarify an underspecified keyword or prompt. For example, as described with reference to FIG. 4B, the prompt UI 400 may provide recommendations for adding more details to the prompt "a fish swimming in the sand." In the example of FIG. 4B, the recommendations "toward the surface." "in groups of ten," and "swiftly" may be provided by the specificity prompt module 520) based on one or more recommendations from the context-aware recommendation engine 510 and/or personalized recommendation engine 514. Additionally, or alternatively, the specificity prompt module 520 may work in conjunction with a large language model to add details to the initial text prompt based on context obtained from the visual concept detection module 502, the specificity detection module 504, the ambiguity detection module 506, and/or the anomaly detection module 508.

Finally, as shown in the example of FIG. 5, a text prompt variation module 522 synthesizes the selections made by the user in response to one or more suggestions provided by one or more of the user interface modules 516, 518, and 520. For example, an initial prompt, "a jazz musician playing a saxophone on a dimly lit stage" may be synthesized to "a jazz artist delivering a soulful saxophone solo under a soft spotlight," or "a saxophonist immersed in a jazz melody on a stage bathed in muted, atmospheric lighting." These variations may align with the user's visual concept, providing a range of potential visual outputs from which the user can choose. The newly synthesized prompt may be used to generate an output, such as an image, from the generative AI model. Additionally, or alternatively, the newly synthesized prompt may be received at the detection module 502 to further refine the newly synthesized prompt. That is, the process described for generating the newly synthesized prompt may be repeated until the user is satisfied with the prompt and/or the output of the generative AI model.

As discussed, the prompt engineering model 260 is an artificial intelligence system designed to refine textual prompts to obtain detailed and tailored outputs from a generative AI model. The prompt engineering model 260 consists of several interconnected modules, each dedicated to refining the text input to align with the user's concept. The system begins with the detection module 500, which receives and channels the text prompt to specific processing modules. The visual concept detection module 502 identifies elements suitable for visual representation, while the specificity detection module 504 and ambiguity detection module 506 find and highlight elements that lack detail or are prone to multiple interpretations, respectively. The anomaly detection module 508 flags elements that deviate from expected patterns. The context-aware recommendation engine 510 then uses the outputs from these modules to suggest plausible keywords or phrases that refine the prompt. The Prompt UI module 512 and personalized recommendation engine 514 enhance the user experience by creating an intuitive interface and tailored suggestions. The prompt engineering model 260 also includes UI modules 516, 518, and 520 that assist users in clarifying ambiguous terms, rectifying anomalous entries, and enriching under-detailed concepts. Finally, the text prompt variation module 522 synthesizes the user's decisions to generate prompt variations closely aligned with the user's intended visual concept. These prompts can be used to generate highly accurate visual outputs or returned to the system for further refinement. By detecting and addressing ambiguities, anomalies, or areas lacking specificity within text prompts and providing personalized recommendations, this model ensures high-quality visual outputs that resonate with user intentions.

Figure 6:
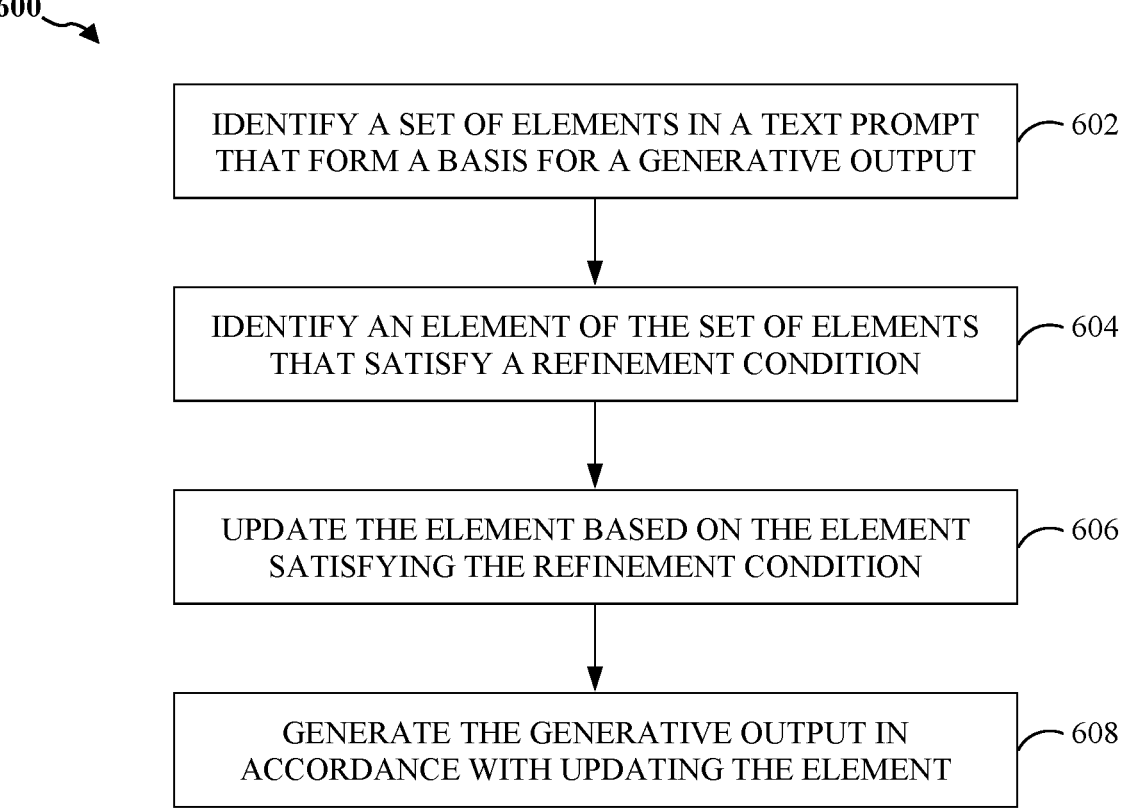
FIG. 6 is a flow diagram illustrating an example process performed by a prompt engineering model, in accordance with some aspects of the present disclosure.

FIG. 6 is a flow diagram illustrating an example process 600 performed by a prompt engineering model 260, in accordance with some aspects of the present disclosure. The example process 600 is an example of refining a text prompt for a generative AI model. As shown in FIG. 6, the process 600 begins at block 602 by identifying a set of elements in a text prompt that form a basis for a generative output.

At block 604, the process 600 identifies an element of the set of elements that satisfy a refinement condition. In some examples, the element satisfies the refinement condition based on the element being associated with an ambiguous meaning. The ambiguous meaning may be based on historical data. In some optional examples, the process 600 may prompt a user to indicate a meaning for the element. Additionally, the process 600 may generate variations of the element based on receiving the meaning in accordance with prompting the user to indicate the meaning. The element may be updated in accordance with the variations. Additionally, or alternatively, the element may satisfy the refinement condition based on the element being associated with an underspecified concept. In some such examples, the process 600 may optionally repeatedly provide additional elements corresponding to the element until satisfying a specificity condition. Additionally, or alternatively, in an optional example, the process 600 may determine a description associated with the set of elements does not conform to expected behavior. In such examples, the element satisfies the refinement condition in accordance with the description failing to conform to expected behavior At block 606, the process 600 updates the element based on the element satisfying the refinement condition. At block 608, the process 600 generates the generative output in accordance with updating the element. In some examples, the generative output is a visualization, such as an image or a video.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine-readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus.

The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray R: disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for processing text prompts, comprising:
    receiving a prompt at a user interface for detecting an input that forms a basis for a generative output from a generative AI model that is trained to perform one or more tasks associated with refining the input provided for the generative AI model;
    detecting the received prompt and processing the receive prompt by:

identifying a first element in the received prompt associated with a visual representation,
        identifying a second element that is understated or lacks detail,
        using semantics to identify an ambiguous word or phrase, and/or
        identifying a pattern that deviates from an expected norm in a given scene description;
    receiving, from the generative AI model, a prioritized list of keywords or phrases for refining the received prompt in response to processing the received prompt;
    automatically prompting a user to select one or more keywords and/or one or more phrases from the prioritized list of keywords and phrases;
    synthesizing a new prompt from the received prompt in response to the user selecting the one or more keywords and/or the one or more phrases; and
    repeating prompt synthesis until the user is satisfied with the generative output from the generative AI model.

2. The method of claim 1, wherein the generative output is a visualization.

3. The method of claim 1, wherein the ambiguous word or phrase is based on historical data.

4. The method of claim 1, wherein the method further comprises receiving additional prompts until the user is satisfied with the generative output.

5. An apparatus for processing text prompts, comprising:
    a processor; and
    a memory coupled with the processor and storing instructions operable, when executed by the processor, to cause the apparatus to:
        receive a prompt at a user interface for detecting an input that forms a basis for a generative output from a generative AI model that is trained to perform one or more tasks associated with refining the input provided for the generative AI model;
        detect the received prompt and processing the receive prompt by:
            identifying a first element in the received prompt associated with a visual representation,
            identifying a second element that is understated or lacks detail,
            using semantics to identify an ambiguous word or phrase, and/or
            identifying a pattern that deviates from an expected norm in a given scene description;
        receive, from the generative AI model, a prioritized list of keywords or phrases for refining the received prompt in response to processing the received prompt;
        automatically prompt a user to select one or more keywords and/or one or more phrases from the prioritized list of keywords and phrases;
        synthesize a new prompt from the received prompt in response to the user selecting the one or more keywords and/or the one or more phrases; and
        repeat prompt synthesis until the user is satisfied with the generative output from the generative AI model.

6. The apparatus of claim 5, wherein the generative output is a visualization.

7. The apparatus of claim 5, wherein the ambiguous word or phrase is based on historical data.

8. The apparatus of claim 5, wherein execution of the instructions further cause the apparatus to receive additional prompts until the user is satisfied with the generative output.

9. A non-transitory computer-readable medium having program code recorded thereon for processing text prompts, the program code executed by a processor and comprising:

program code to receive a prompt at a user interface for detecting an input that forms a basis for a generative output from a generative AI model that is trained to perform one or more tasks associated with refining the input provided for the generative AI model;

detect the received prompt and processing the receive prompt by:

identifying a first element in the received prompt associated with a visual representation, identifying a second element that is understated or lacks detail, using semantics to identify an ambiguous word or phrase, and/or identifying a pattern that deviates from an expected norm in a given scene description;

program code to receive, from the generative AI model, a prioritized list of keywords or phrases for refining the received prompt in response to processing the received prompt;

program code to automatically prompt a user to select one or more keywords and/or one or more phrases from the prioritized list of keywords and phrases;

program code to synthesize a new prompt from the received prompt in response to the user selecting the one or more keywords and/or the one or more phrases; and program code to repeat prompt synthesis until the user is satisfied with the generative output from the generative AI model.

10. The non-transitory computer-readable medium of claim 9, wherein the generative output is a visualization.

11. The non-transitory computer-readable medium of claim 9, wherein the ambiguous word or phrase is based on historical data.

12. The non-transitory computer-readable medium of claim 9, wherein the program code further comprises program code to receive additional prompts until the user is satisfied with the generative output.

* * * * *